US011463517B2

(12) United States Patent
Saraf et al.

(10) Patent No.: US 11,463,517 B2
(45) Date of Patent: Oct. 4, 2022

(54) METHODS AND SYSTEM FOR TRAINING AND REINFORCING COMPUTER VISION MODELS USING DISTRIBUTED COMPUTING

(71) Applicant: Verizon Patent and Licensing Inc., Basking Ridge, NJ (US)

(72) Inventors: Rohit Shirish Saraf, Nashua, NH (US); Bhumip Khasnabish, Lexington, MA (US); John Aceron, Chantilly, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 244 days.

(21) Appl. No.: 16/944,737

(22) Filed: Jul. 31, 2020

(65) Prior Publication Data
US 2022/0038534 A1 Feb. 3, 2022

(51) Int. Cl.
| H04L 67/1095 | (2022.01) |
| G06N 3/08 | (2006.01) |
| G06K 9/62 | (2022.01) |
| G06N 3/04 | (2006.01) |
| H04L 67/00 | (2022.01) |

(52) U.S. Cl.
CPC ........ *H04L 67/1095* (2013.01); *G06K 9/6255* (2013.01); *G06K 9/6256* (2013.01); *G06N 3/04* (2013.01); *G06N 3/08* (2013.01); *H04L 67/34* (2013.01)

(58) Field of Classification Search
CPC .. H04L 12/2825; H04L 67/1095; G06N 20/20
See application file for complete search history.

(56) References Cited

U.S. PATENT DOCUMENTS

| 10,867,245 B1 * | 12/2020 | Farhady Ghalaty ... G06N 3/084 |
| 2019/0286938 A1 * | 9/2019 | Backhus .................. G06T 17/20 |
| 2020/0007409 A1 * | 1/2020 | Kim ....................... H04L 43/062 |

(Continued)

OTHER PUBLICATIONS

Ballout et al. "The Benefits of Synthetic Data for Action Categorization", 2020 Int'l Joint Conf'n on Neural Networks, Jul. 19, 2020. Inspec Accession No. 20005887, DOI: 10.1109/IJCNN48605. 2020.9207337. (Year: 2020).*

(Continued)

*Primary Examiner* — Kevin T Bates
*Assistant Examiner* — Dae Kim

(57) ABSTRACT

Systems and methods described herein perform computer vision (CV) model training in a distributed edge network. Regional Multi-access Edge Compute (MEC) clusters are provided with a local copy of a CV model and a local synthetic training data generator. A MEC cluster receives client data requiring computer vision and applies the local copy of the CV model to the client data. The MEC cluster detects an exception to the local copy of the CV model and generates local synthetic training data for the exception. The MEC cluster updates, based on the local synthetic training data, the local copy of the CV model to form an updated local CV model. The MEC cluster sends the local synthetic training data and the updated local CV model to a central network. The central network uses the local synthetic training data to update a master CV model and any other interconnected CV models.

20 Claims, 13 Drawing Sheets

(56) References Cited

U.S. PATENT DOCUMENTS

2020/0010093 A1* 1/2020 Li ................ G07C 5/008
2020/0027022 A1* 1/2020 Jha ................ H04L 67/10
2020/0394578 A1* 12/2020 Taggart .......... G06Q 10/0633
2021/0174131 A1* 6/2021 Schwartz ........... G06V 10/82

OTHER PUBLICATIONS

Wang et al. "Computation Offloading in Multi-Access Edge Computing Using a Deep Sequential Model Based on Reinforcement Learning", IEEE Comm'ns Magazine, vol. 57, Issue 5, May 13, 2019. Inspec Accession No. 18670195, DOI: 10.1109/MCOM.2019.1800971. (Year: 2019).*

Calo et al. "Edge computing architecture for applying AI to IoT", 2017 IEEE Int'l Conf. on Big Data, Dec. 11, 2017. Inspec Accession No. 17505010, DOI: 10.1109/BigData.2017.8258272. (Year: 2017).*

Chen et al. "Deep Learning with Edge Computing: A Review", Proceedings of the IEEE, vol. 107, Issue 8, Jul. 15, 2019. Inspec Accession No. 18884036, DOI: 10.1109/JPROC.2019.2921977. (Year: 2019).*

* cited by examiner

METHODS AND SYSTEM FOR TRAINING AND REINFORCING COMPUTER VISION MODELS USING DISTRIBUTED COMPUTING

BACKGROUND

Computer vision models may include a convolutional neural network (CNN) and/or another type of deep learning neural network trained to identify objects, such as signs, traffic signals, vehicles, pedestrians, bicyclists, and/or scooters. Computer vision models may be trained using both real-world data and synthetic data. Synthetic data generally includes data that is artificially created rather than being generated by actual events. Autonomous vehicle systems and collision avoidance systems, for example, may operate by applying real-world data to computer vision models that are trained with synthetic data.

DETAILED DESCRIPTION OF PREFERRED EMBODIMENTS

Figure 1:
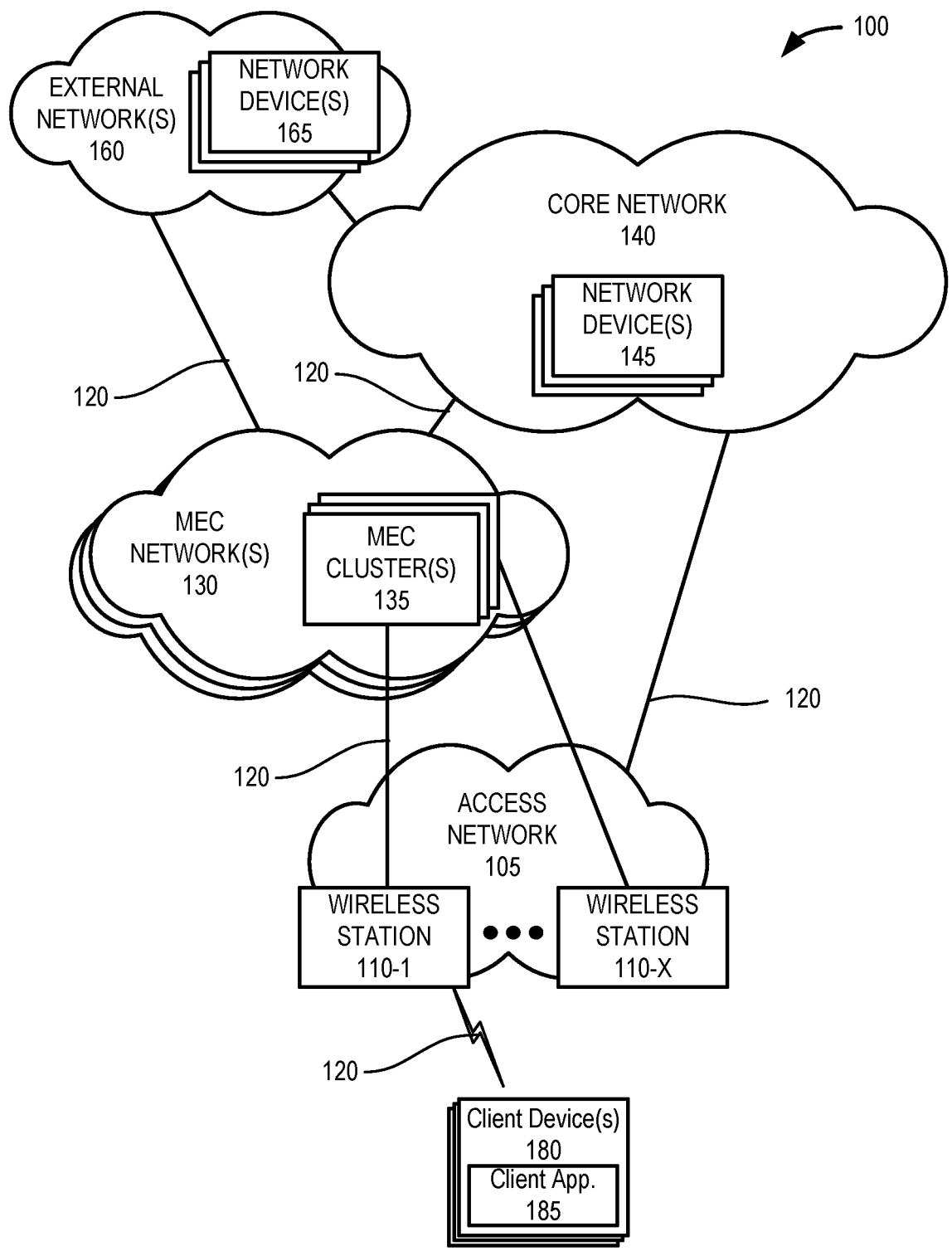
FIG. 1 is a diagram illustrating an exemplary network environment in which distributed computer vision model training described herein may be implemented.

The following detailed description refers to the accompanying drawings. The same reference numbers in different drawings may identify the same or similar elements. Also, the following detailed description does not limit the invention.

Client-side devices (e.g., a vehicle telematics system, a smart phone, etc.) for systems that use computer vision have typically needed to rely on powerful computing resources in order to perform the calculations needed for computer vision, and those resources may only be available via a cloud computing network (due to constraints on power consumption, size, storage, upgradability, etc.). However, signal latency associated with traditional cloud-based network communications may prevent the use of computer vision for uses that require real-time information updates to clients, such as autonomous vehicle systems and collision avoidance systems. New broadband cellular networks offer edge computing services (sometimes referred to as Multi-access Edge Compute (MEC) platforms or Mobile Edge Compute platforms) that can transfer network computing loads to servers located closer to client devices than traditional cloud services, which can reduce the latency, jitter and/or other timing constraints that have been impediments to computer vision use.

Customer applications running on client devices can take advantage of MEC compute resources to provide enhanced services (such as computer vision). For example, an application may offload compute tasks to a MEC platform that can provide services that are not capable by a local processor in the client device, but can be provided within a timing constraint of the application. Depending on the location of the edge servers relative to the point of attachment (e.g., a wireless station for a client device), MEC platforms can provide various services and applications to client devices with minimal latency, jitter, etc. For example, MEC platforms may be usable for services where clients require "real-time" transfers (e.g., less than about 30 milliseconds, preferably less than about 13 milliseconds).

When implementing computer vision services at MEC platforms, computer vision models may be used by MEC platforms to facilitate the object recognition capabilities of the services. The computer vision models may be based on neural networks that are trained and continuously retrained. For example, one method to do training/retraining of computer vision models is to use "synthetic input data"—data that is generated rather than captured using image capture devices (e.g., cameras). Training of the computer vision models at local MEC platforms can allow changes to be available for end users immediately. However, to ensure consistent performance, it may be useful in some cases to maintain model uniformity throughout the regional MEC platforms and/or at a central distribution system. Additionally, training data sets used to do model training/retraining may be large relative to the bandwidth available to transmit the data set to the MEC—for example, a multi-Gigabyte-sized data set may take several minutes to transmit from a cloud-based data source to a MEC platform—which may impact how quickly a model may be trained/retrained.

According to implementations described herein, training and retraining the neural-network-based Computer Vision (CV) models is performed by MEC platforms at a network edge to reduce transmission times (e.g., uploads and downloads) so that liveliness of the models and rapid recognition can be maintained. A local MEC cluster is provided with a copy of a CV model and a local synthetic training data generator. A MEC cluster receives client data requiring computer vision recognition and applies the local copy of the CV model to the client data. If the recognition process at the MEC cluster detects an exception to the local copy of the CV model in the recognition of the client data, the MEC cluster may generate local synthetic training data for the exception. The MEC cluster updates, based on the local synthetic training data, the local copy of the CV model to form an updated local CV model which can be used to perform image recognition services for the client going forward. The MEC cluster may then send the local synthetic training data and the updated local CV model to the central network device. The central network device uses the local synthetic training data to update a master CV model and any other interconnected CV models, which are then redistributed out to participating MEC clusters.

FIG. 1 illustrates an exemplary environment 100 in which an embodiment of distributed computer vision model training may be implemented. As illustrated, environment 100 includes an access network 105, one or more local MEC networks 130, a core network 140, and one or more external networks 160. Access network 105 may include wireless stations 110-1 through 110-X. MEC network 130 may include multiple MEC clusters 135 (e.g., a group of configurable network/computing devices also referred to herein as an "edge device"); core network 140 may include network devices 145; and external network 160 may include network devices 165. Environment 100 further includes one or more client devices 180.

The number, the type, and the arrangement of network devices and the number of client devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between client devices 180 and the network devices. Environment 100 may be implemented to include wired, optical, and/or wireless communication links among the network devices and the networks illustrated. A communication link may be direct or indirect. For example, an indirect connection may involve an intermediary device and/or an intermediary network not illustrated in FIG. 1. A direct connection may not involve an intermediary device and/or an intermediary network. The number and the arrangement of communication links 120 illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 140.

Depending on the implementation, access network 105 may include one or multiple types of wireless stations 110. For example, wireless stations 110 may include a next generation Node B (gNB), an evolved Node B (eNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), a future generation wireless access device, another type of wireless access node (e.g., a WiMax device, a hotspot device, etc.) that provides a wireless access service. According to some exemplary implementations, wireless stations 110 may include a combined functionality of multiple radio access technologies (e.g., 4G and 5G functionality).

MEC network 130 may include a client device application or service layer network (also referred to as an "application service layer network"). According to an implementation, MEC network 130 includes a platform that provides application services at the edge of a network. MEC network 130 may include multiple MEC clusters 135, which may be located to provide geographic proximity to various groups of wireless stations 110. In some instances, MEC clusters 135 may be co-located within a wireless station 110. In other instances, MEC clusters 135 may be co-located with network devices 145 of core network 140.

MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.). As described further herein, MEC clusters 135 (also referred to as edge-compute clusters) may be used to implement distributed computer vision model training.

Core network 140 may include one or multiple networks of one or multiple network types and technologies. For example, core network 140 may be implemented to include a next generation core (NGC) network for a 5G network, an Evolved Packet Core (EPC) of an LTE network, an LTE-A network, an LTE-A Pro network, and/or a legacy core network. Depending on the implementation, core network 140 may include various network devices 145 that may implement or host network functions, such as for example, a user plane function (UPF), an access and mobility management function (AMF), a session management function (SMF), a unified data management (UDM) function, an authentication server function (AUSF), a network slice selection function (NSSF), and so forth. According to other exemplary implementations, core network 140 may include additional, different, and/or fewer network devices than those described.

External network 160 may include one or multiple networks. For example, external network 160 may be implemented to include a cloud network, a service or an application-layer network, the Internet, an Internet Protocol Multimedia Subsystem (IMS) network, a Rich Communication Service (RCS) network, a packet-switched network, or other type of network that hosts a client device application or service. According to an implementation, external network 160 may provide cloud compute services for a specific service provider (e.g., Amazon® Web Services (AWS), Microsoft Azure®, IBM IOT Bluemix®, etc.) network. Depending on the implementation, external network 160 may include various network devices 165 that provide various applications, services, or other type of client device assets, such as servers (e.g., web, application, cloud, etc.), mass storage devices, data center devices, and/or other types of network services pertaining to various network-related functions. As described further herein, network devices 165 may implement distributed computer vision model training.

Client device 180 includes a device that has computational and wireless communication capabilities. Client device 180 may be implemented as a Vehicle-to-Everything (V2X) communications device, an onboard vehicle control unit, a telematics device, a mobile device, a portable device, an augmented reality system, etc. According to various exemplary embodiments, client device 180 may include or be connected to an image capture device, such as a video camera or other video/audio equipment. Client device 180 may be configured to execute various types of software (e.g., applications, programs, graphics processing, etc.). Client device 180 may support one or multiple radio access technologies (RATs, such as 4G, 5G, etc.), one or multiple frequency bands, dual-connectivity, and so forth. Additionally, client device 180 may include one or multiple communication interfaces that provide one or multiple (e.g., simultaneous or non-simultaneous) connections via the same or different RATs, frequency bands, etc.

As described further herein, client device 180 may download, store, and/or register a client application 185. Client application 185 may be an application that relies on computer vision models. For example, client application 185 may include a collision avoidance system, an autonomous vehicle system, etc. As described further herein, client application 185 may be executed on client device 180 to selectively use MEC compute resources, particularly MEC compute resources that provide computer vision services and distributed computer vision model training.

Access network 105 and/or core network 140 may implement interfaces that allow MEC network 130 to determine/specify information related to providing communications services to client devices 180. For example, the interfaces may allow MEC network 130 to determine a geographic location, network area, or another location identifier of a client device 180 (which may be useful in determining an appropriate MEC cluster 135 on which to deploy a MEC workload). The interfaces may also allow the MEC network 130 to determine operational characteristics of the communications path between a MEC cluster 135 and a client device 180 (e.g., expected one-way/round trip latency, congestion-related parameters, etc.). In some implementations, the interfaces may allow MEC network 130 to specify a desired communications environment for communications between a MEC cluster 135 and client device 180 (e.g., quality-of-service levels, network slice types, etc.). In some implementations, the interface may be an application programming interface (API) that interacts with services in the access network 105 and/or core network 140 that provide requested information and provisioning services.

Figure 2:
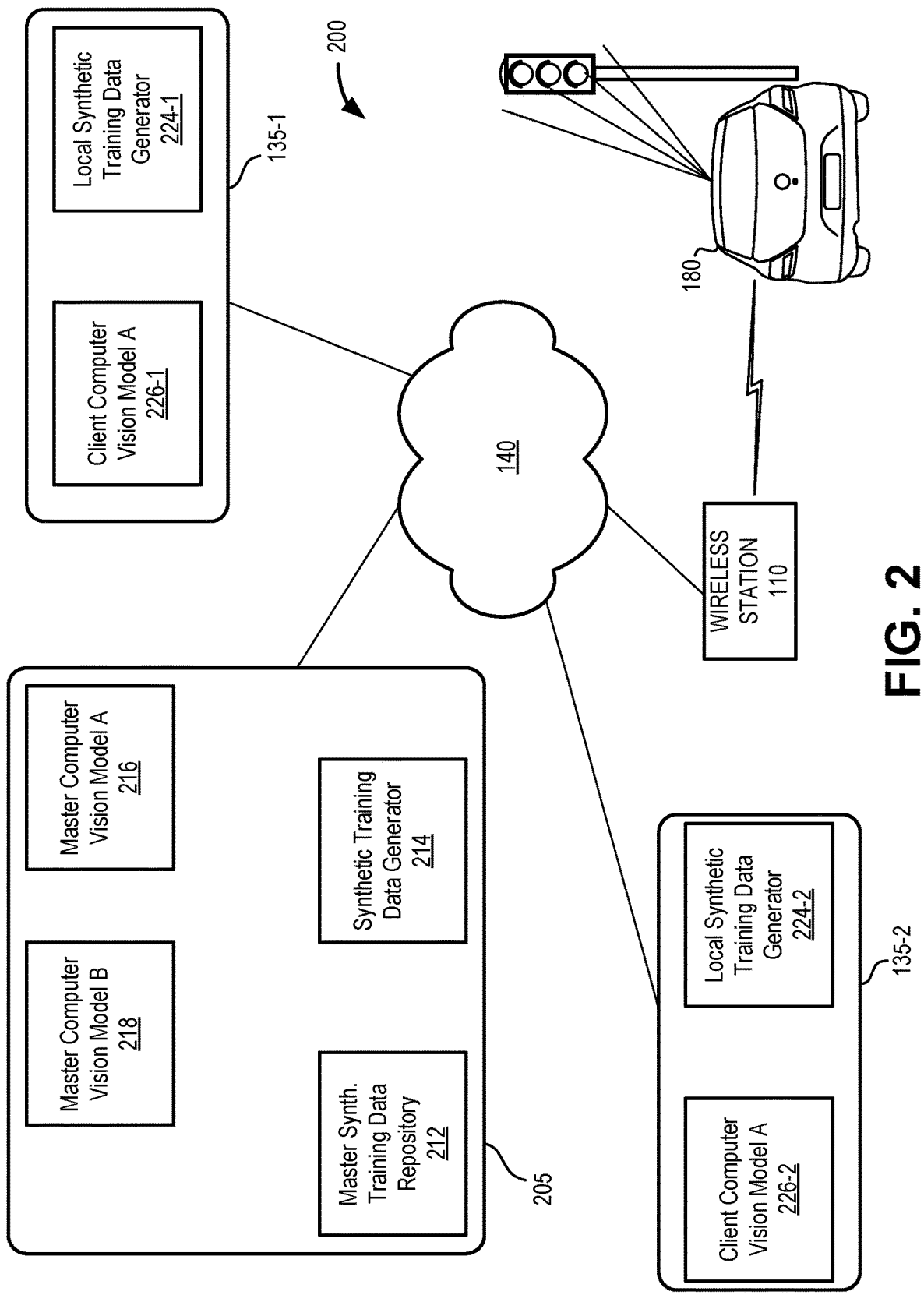
FIG. 2 is a diagram illustrating exemplary network elements for distributed computer vision model training in the network environment of FIG. 1.

FIG. 2 is a diagram illustrating exemplary network elements for distributed computer vision model training in a portion 200 of network environment 100. As illustrated, network portion 200 includes a central cloud sever 205, wireless station 110, MEC clusters 135-1 and 135-2 (referred to generically as MEC cluster 135 and collectively as MEC clusters 135), core network 140, and client device 180. Central cloud sever 205 may include a master synthetic training data repository 212, synthetic training data generator 214, a computer vision model A 216, and a computer vision model B 218. MEC cluster 135-1 may include a local copy of synthetic training data generator 224-1 and a local copy of computer vision model A 226-1. MEC cluster 135-2 may include another local copy of synthetic training data generator 224-2 and another local copy of computer vision model A 226-2. As previously described in relation to environment 100, the number of network devices, the type of network devices, the communication links, and so forth, in network portion 200 are exemplary.

Central cloud sever 205 may be located, for example, within external network 160. Central cloud sever 205 may host the computer vision models (e.g., master CV model A 216 and master CV model B 218) and also software required for generating synthetic data (e.g., synthetic training data generator 214). Master synthetic training data repository 212 may include a master list of all synthetic training data, such as training data generated by synthetic training data generator 214, which may or may not be applied to any particular CV model. In the context of a collision avoidance system, for example, master synthetic training data repository 212 may include data for signs, vehicles, pedestrians, bicycles, road features, geographic features, traffic signals, etc. Synthetic training data generator 214 generate training data applied to train master CV model A 216 and master CV model B 218. Master CV model A 216 and master CV model B 218 may include models that may be applied by MEC clusters 135 to facilitate client applications 185. Master CV model A 216 and master CV model B 218 may be interconnected and rely on the same (or overlapping) synthetic training data. For example, each of CV model A 216 and CV model B 218 may apply to different features, such as signs, pedestrians, cars, traffic lights, etc. While only two master CV models are shown with central cloud server 205 in FIG. 2, in practice, there may be many master CV models.

Each MEC cluster 135 may include a local synthetic training data generator 224 and a local copy of a relevant CV model. For example, client computer vision model A 226-1 may be used by MEC cluster 135-1, and client computer vision model A 226-2 may be used by MEC cluster 135-2. MEC clusters 135 may employ multiple other models (not shown). During an initial deployment at a MEC cluster 135, client CV model A 226-1 and 226-2 may be identical to corresponding master CV model A 216.

As described further herein, MEC cluster 135 may provide additional training and reinforcement of a respective client CV model 226. A particular MEC cluster 135 (a) will typically be located closer to client device 180 than central cloud server 205, (b) offers connectivity to client device 180 with significantly higher bandwidth and lower latency, jitter, and other timing considerations as compared to services provided in central cloud server 205, and (c) connects with high bandwidth links (e.g., links 120) to the core network 140 and/or peer cloud infrastructure. By using this type of distributed computing approach, CV models can be used in applications requiring "real-time" timing requirements while being able to be quickly adapted and scaled as per the underlying requirements of use cases/applications.

Figure 3A:
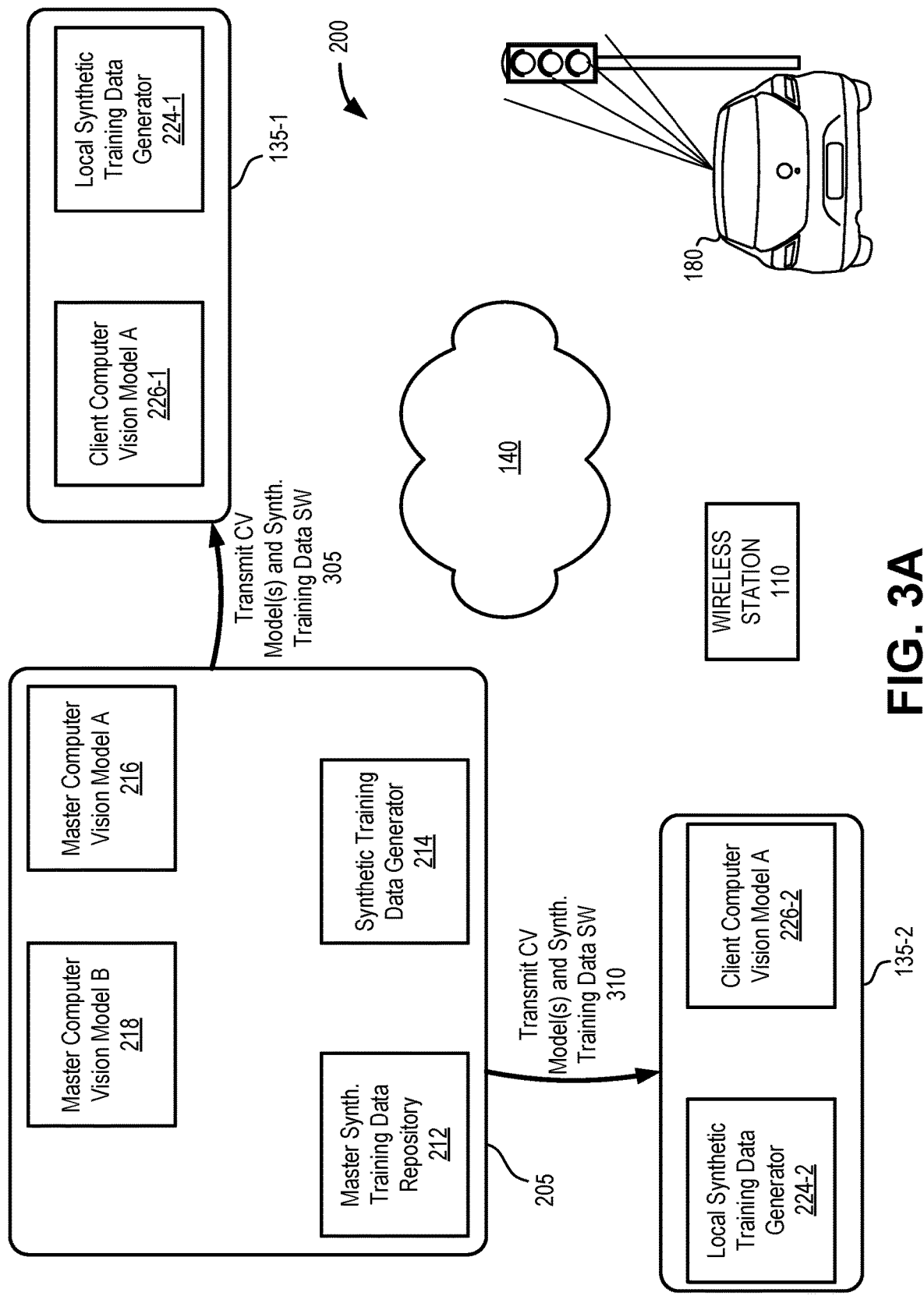
FIGS. 3A-3E are diagrams illustrating exemplary communications for performing distributed computer vision model training in a portion of the network environment of FIG. 1.

FIGS. 3A-3E are diagrams illustrating exemplary communications in network portion 200 for performing distributed computer vision model training. Referring to FIG. 3A, according to an exemplary scenario, a new instance of an application service—for example, a computer vision service—may be instantiated at a MEC location (e.g., MEC cluster 135-1). Relevant computer vision models (e.g., based on a particular use case/application) may be transmitted from central cloud server 205 to the MEC cluster 135-1 along with synthetic data training software. For example, as shown at reference 305, central cloud server 205 may transmit client CV model A 226-1 and local synthetic training data generator 224-1 to MEC cluster 135-1. Similarly, as shown at reference 310, central cloud server 205 may transmit client CV model A 226-2 and local synthetic training data generator 224-2 to MEC cluster 135-2.

Local synthetic training data generator 224 may be provided to the respective MEC clusters 135 to enable real-time training/retraining of a computer vision model (e.g., client CV model A 226-1 or client CV model A 226-2) at a network edge. As an example, for an autonomous driving vehicle application, client CV model A 226 may be responsible for recognizing traffic lights. Other CV models (not shown) may be used and trained/retrained simultaneously at each MEC cluster 135. Retraining of client CV model A 226 may be required, for example, due to changing environments, storms, construction, or other events that may alter computer vision.

Figure 3B:
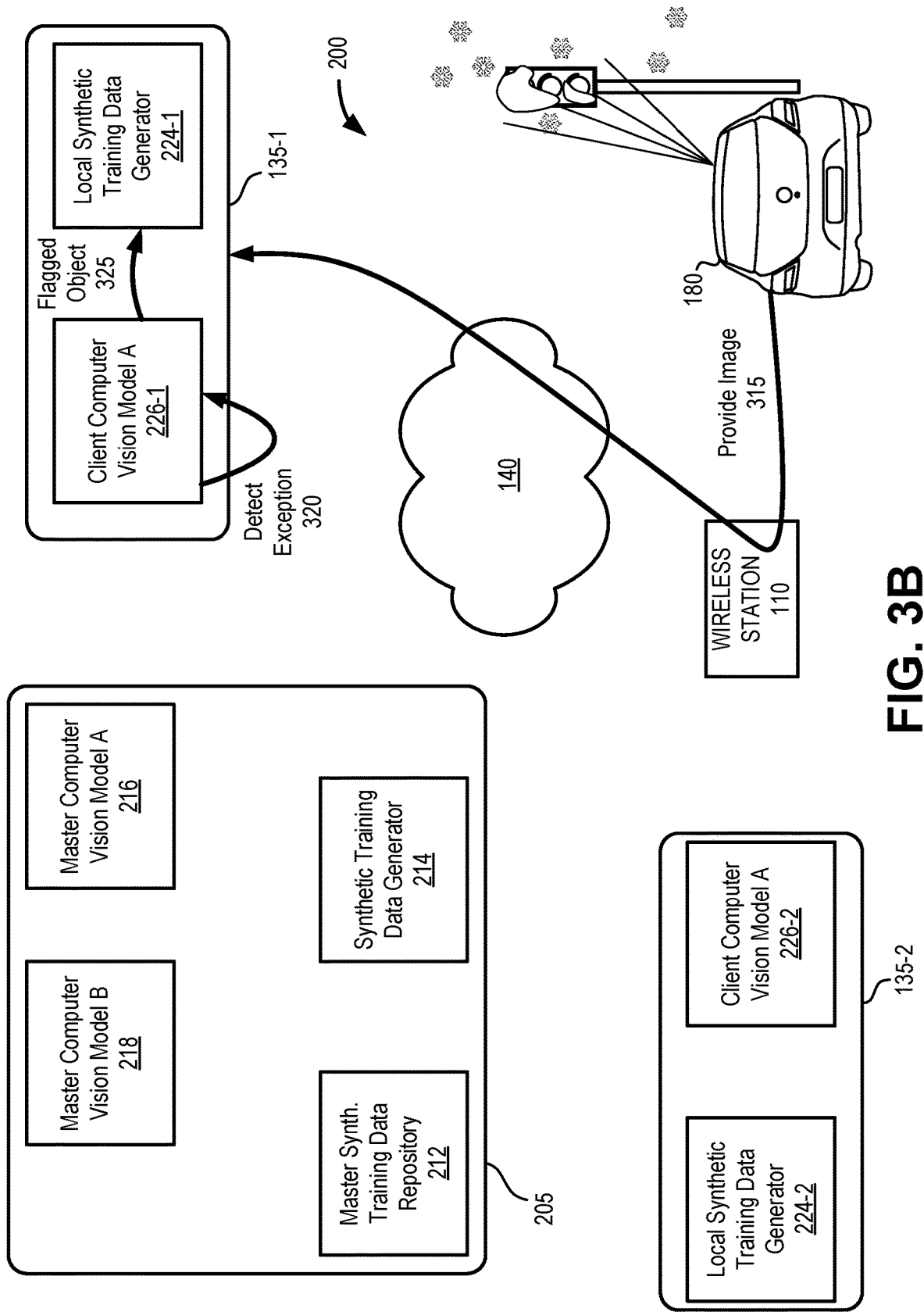

Referring to FIG. 3B, assume an exception to client CV model A 226 occurs for a recognition task during a winter storm where traffic lights in a certain region (e.g., a geographic region serviced by MEC cluster 135-1) are covered by snow/debris. As shown at reference 315, client device 180 may provide an image 315 with one or more traffic light objects that cannot be recognized by client CV model A 226. Thus, retraining of the Client CV model A may be required at least in the region serviced by MEC 135-1. Although FIG. 3B shows communications for images 315 traversing core network 140, in other implementations, communications between wireless station 110 and MEC cluster 135-1 may bypass core network 140.

As show at reference 320, MEC 135-1 may detect an exception in client CV model A 226-1 based on the provided image 315. For example, to detect exceptions for retraining, one method may utilize previous positive identifications for an object at a specific location (e.g., previously received from the same or other client devices 180). When a specific object is revisited but is not identified as positive (within a given tolerance), the new data points may be flagged for model retraining. As indicted at reference 325, client CV model A 226-1 may forward a flagged object to local synthetic training data generator 224-1.

Figure 3C:
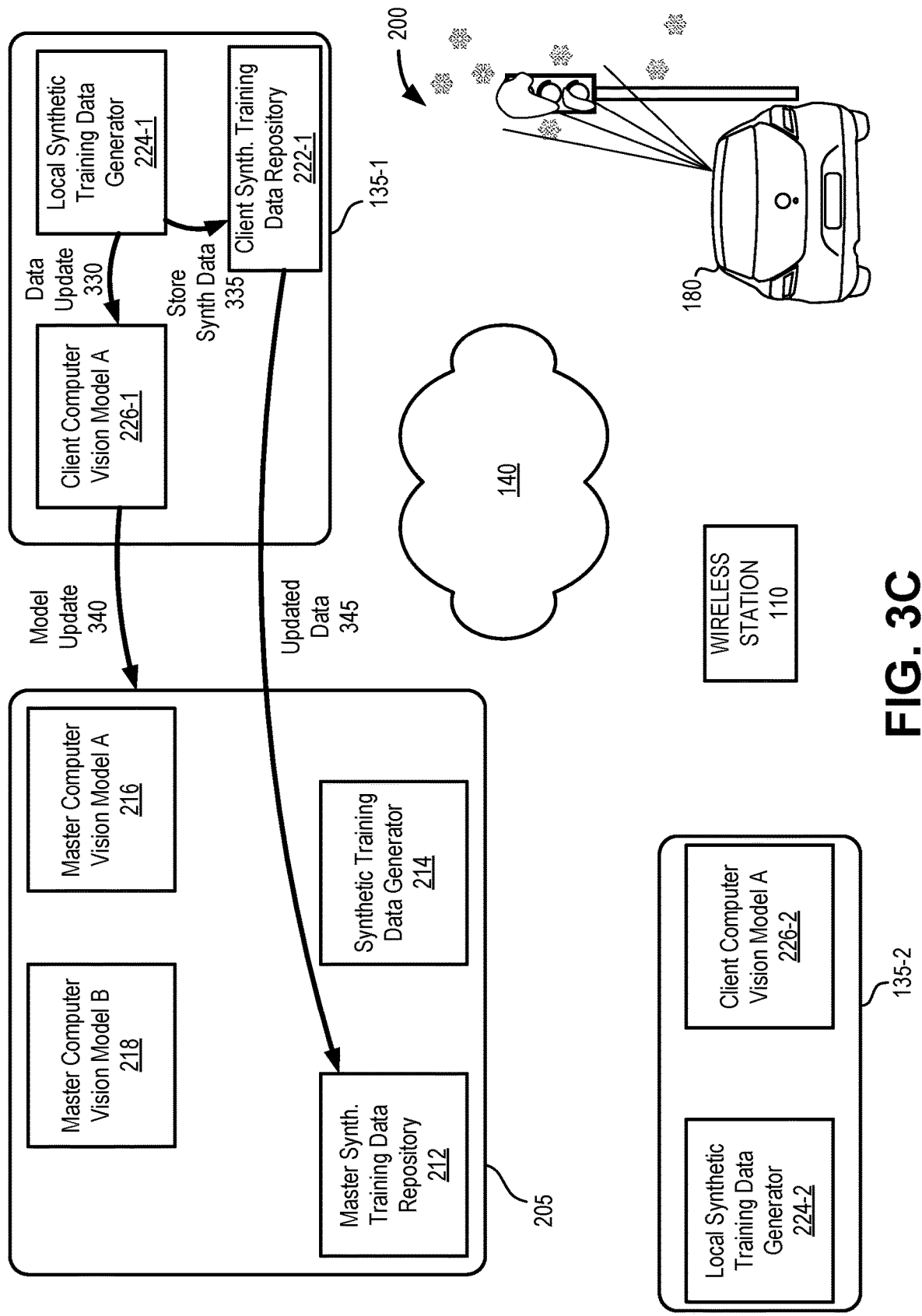

Referring to FIG. 3C, based on the flagged object, local synthetic training data generator 224-1 may generate multiple types of artificial data (e.g., images, 2D models, 3D models, labels, etc.) that assist with retraining of client CV model A 226-1 in MEC cluster 135-1. Local synthetic training data generator 224-1 may provide a synthetic data update 330 to client CV model A 226-1. Thus, client CV Model A 226-1 can be retrained in real time. Based on configuration, and on geographical proximity and/or similarity (e.g., climate), the geographic area that relies on the exception can be retrained and serviced almost immediately (e.g., with updated models generated in under a second). Synthetic data generation often requires large amounts of data storage (e.g., multiple gigabytes (GBs)). As indicated by reference 335, the new synthetic data may be temporarily stored in a client synthetic data repository 222-1 of MEC cluster 135-1. The new CV model A may be used going forward to service recognition requests from client applications.

After local retraining of client CV model A 226-1 is complete, the updated client CV model A 226-1 of MEC cluster 135-1 may be provided to central cloud server 205 for updating of the master CV model A 216, as indicated by reference 340. Similarly, master synthetic training data repository 212 is updated by client synthetic data repository 222-1 of MEC cluster 135-1, as indicated by reference 345. According to an implementation, uploads from MEC cluster 135-1 to central cloud server 205 (e.g., to provide the updated client CV model A 226-1 and/or client synthetic data repository 222-1) may be conducted in a manner to conserve network resources (e.g., links 120). For example, uploads from MEC cluster 135-1 to central cloud server 205 may be provide as lower priority traffic or sent only during off-peak times. Although FIG. 3C shows direct communications between MEC cluster 135-1 and central cloud server 205 (e.g., in external network 160) for references 340 and 345 without traversing core network 140, in other implementations, communications between MEC cluster 135-1 and central cloud sever 205 may traverse core network 140.

Figure 3D:
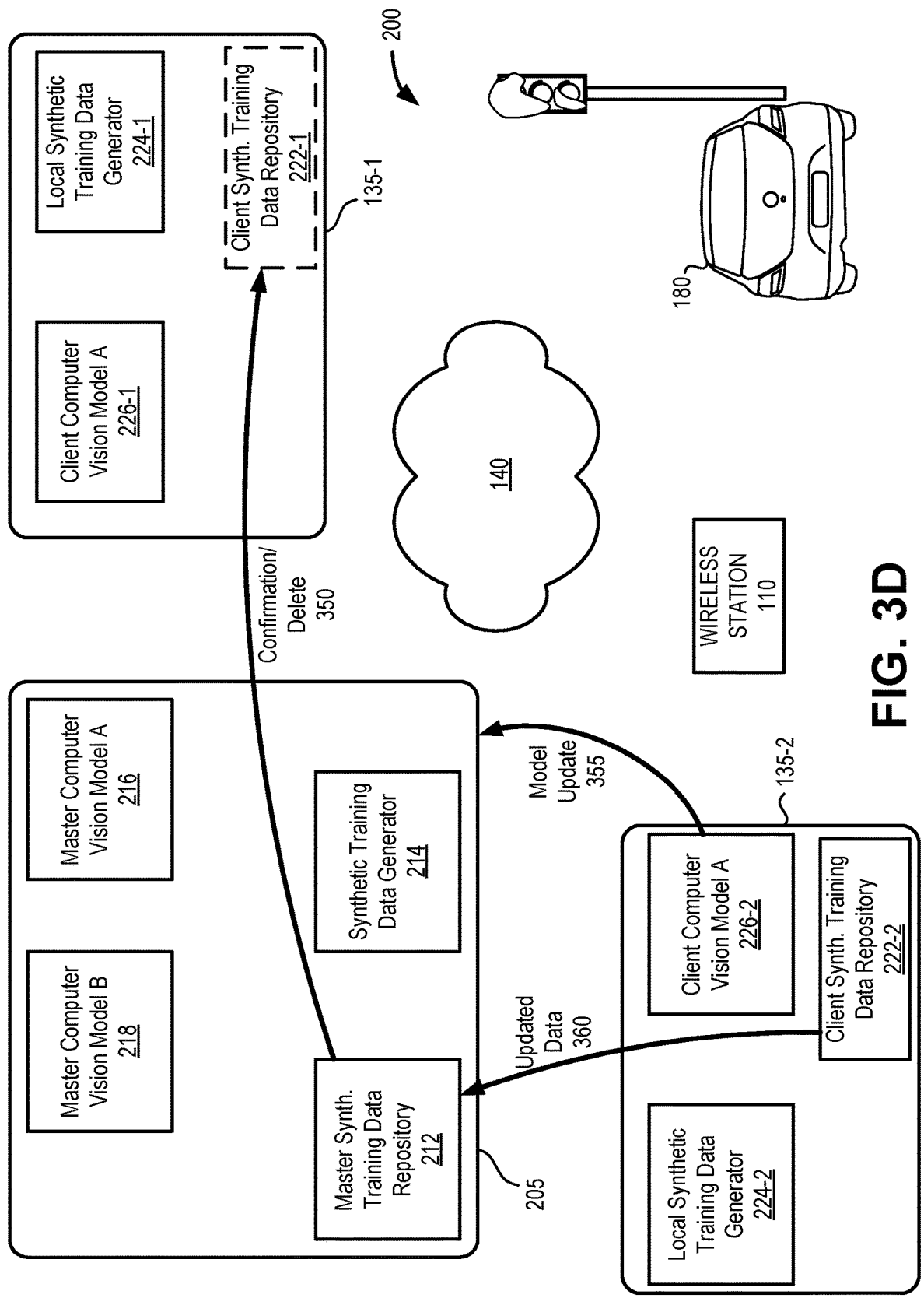

Referring to FIG. 3D, after master synthetic training data repository 212 is updated (at references 345), master synthetic training data repository 212 may provide a confirmation 350 to client synthetic training data repository 222-1, which signals that client synthetic data repository 222-1 may be deleted. Client synthetic training data repository 222-1 may be deleted, for example, to conserve limited storage resources at MEC cluster 135-1. Central cloud sever 205 may receive updated CV models and new local client synthetic training data from other MEC clusters 135. For example, as shown at references 355 and 360, central cloud sever 205 may receive an updated CV model (e.g., client CV model A 226-2) and new client synthetic training data repository (e.g., client synthetic training data repository 222-2) from MEC clusters 135-2.

Figure 3E:
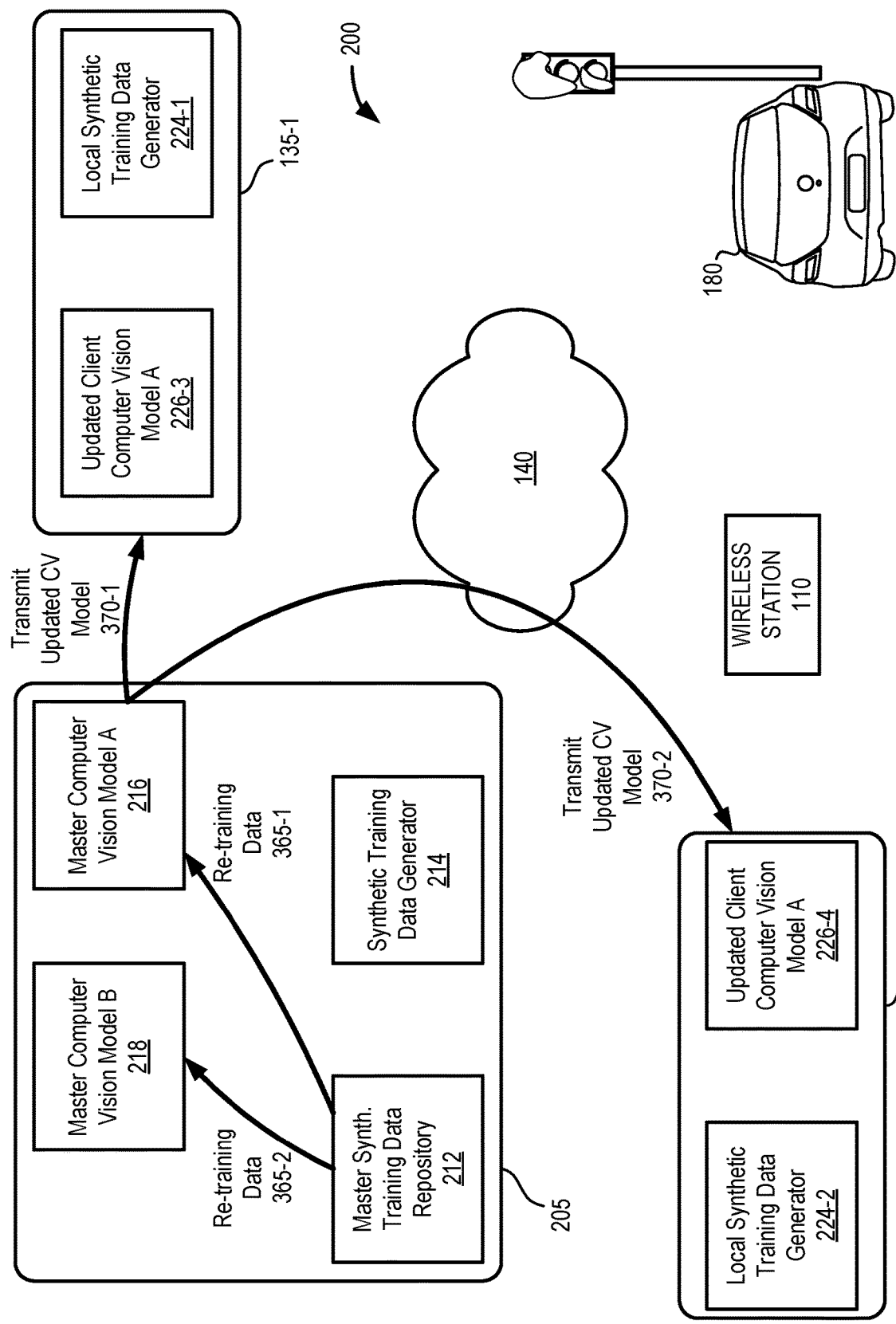

Referring to FIG. 3E, central cloud sever 205 may use the updated data from all the MEC clusters 135 (e.g., including model updates 340/355 and updated data 345/360) that is collected in master synthetic training data repository 212 to retrain and update all master CV models (or all the interconnected master CV models) in its library. For example, as shown at references 365-1 and 365-2, master synthetic training data repository 212 may provide updated data for retraining master CV model A 216 and master CV model B 218. Retraining of all master CV models at central cloud sever 205 may be necessary when there are dependencies between the various master CV models.

Once all the master CV models in the library of central cloud sever 205 are updated, central cloud sever 205 may transmit the updated CV models to the respective MEC clusters 135. For example, relevant updated computer vision models (e.g., based on a particular use case/application) may be transmitted from central cloud server 205 to the MEC clusters 135-1 and 135-2. As shown at reference 370-1 and 370-2 central cloud server 205 may transmit the updated client CV model A 226 (e.g., updated client CV model A 226-3 and 226-4) to MEC clusters 135-1 and 135-2. According to different implementations, the updated CV models may be transmitted from central cloud server 205 to MEC clusters 135 with or without use of core network 140.

According to an implementation, the retraining of the master CV models and/or the updating (transmitting) of the client CV models may be perform in a manner to minimize network disruption and conserve available resources. For example, pushing out updated client CV models (e.g., updated client CV model A 226-3 and 226-4) may be restricted to set configurable times (e.g., during night/low traffic hours) or based on particular use cases (e.g., only MEC clusters 135 in regions with possible snow may get CV model updates associated with potential snow-related obstructions without delay, but other MEC clusters 135 may only get updated during night/low traffic conditions).

Figure 4:
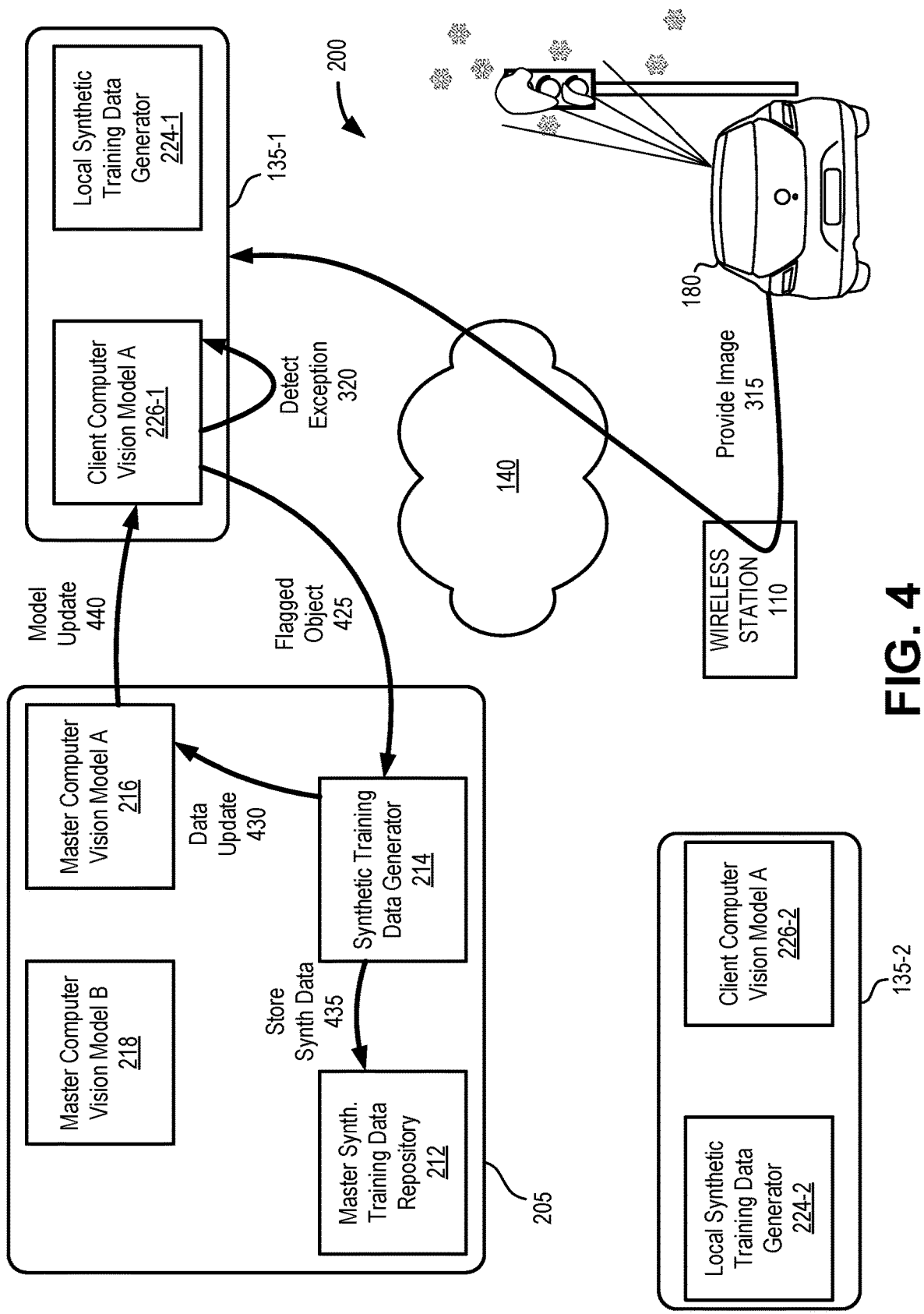
FIG. 4 is a diagram illustrating exemplary communications for performing distributed computer vision model training in a portion of the network environment of FIG. 1, according to another implementation.

According to another implementation, a MEC cluster 135 may lack sufficient resources to perform the local CV model retraining described above in FIGS. 3A-3E. FIG. 4 is a diagram illustrating exemplary communications in network portion 200 for performing distributed computer vision model training when MEC cluster 135 is unable to perform the local CV model retraining.

For example, in FIG. 4, assume that client device 180 provides an image and client CV Model A 226-1 detects a model exception, as described above in connection with references 315 and 320 of FIG. 3B. Further assume MEC cluster 135-1 lacks available computing resources to perform local CV model retraining. In this case, as indicted at reference 425, client CV model A 226-1 may forward a flagged object to synthetic training data generator 214 of central cloud sever 205. Synthetic training data generator 214 may use the exception along with any annotated/ exception data (e.g., an image of the exception) to then generate synthetic data based on the possible variants.

Synthetic training data generator 214 may provide a synthetic data update 430 to master CV model A 216. As indicated by reference 435, the new synthetic data may be stored in the master synthetic data repository 212 of central cloud server 205. According to an implementation, an updated master CV model A 216 may be immediately provided to MEC cluster 135-1, as indicated by reference 440. Subsequent to providing the model update, and similar to communications 355-370 described above, central cloud server 205 may proceed to incorporate updates from other MEC clusters 135, retrain all the master CV models that may be impacted, and push new updated models to each corresponding MEC cluster 135.

Figure 5A:
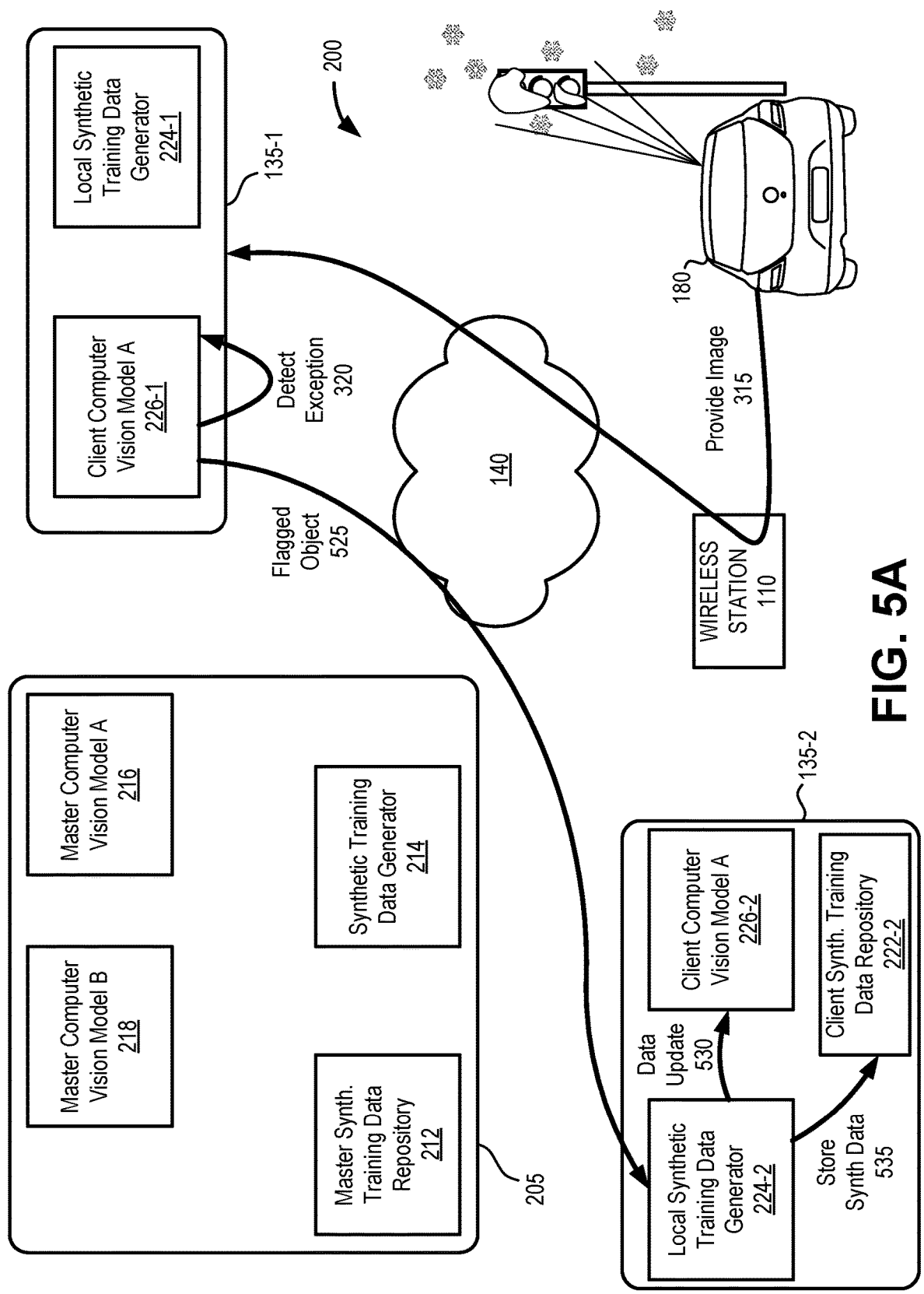
FIGS. 5A and 5B are diagrams illustrating exemplary communications for performing distributed computer vision model training in a portion of the network environment of FIG. 1, according to still another implementation.
Figure 5B:
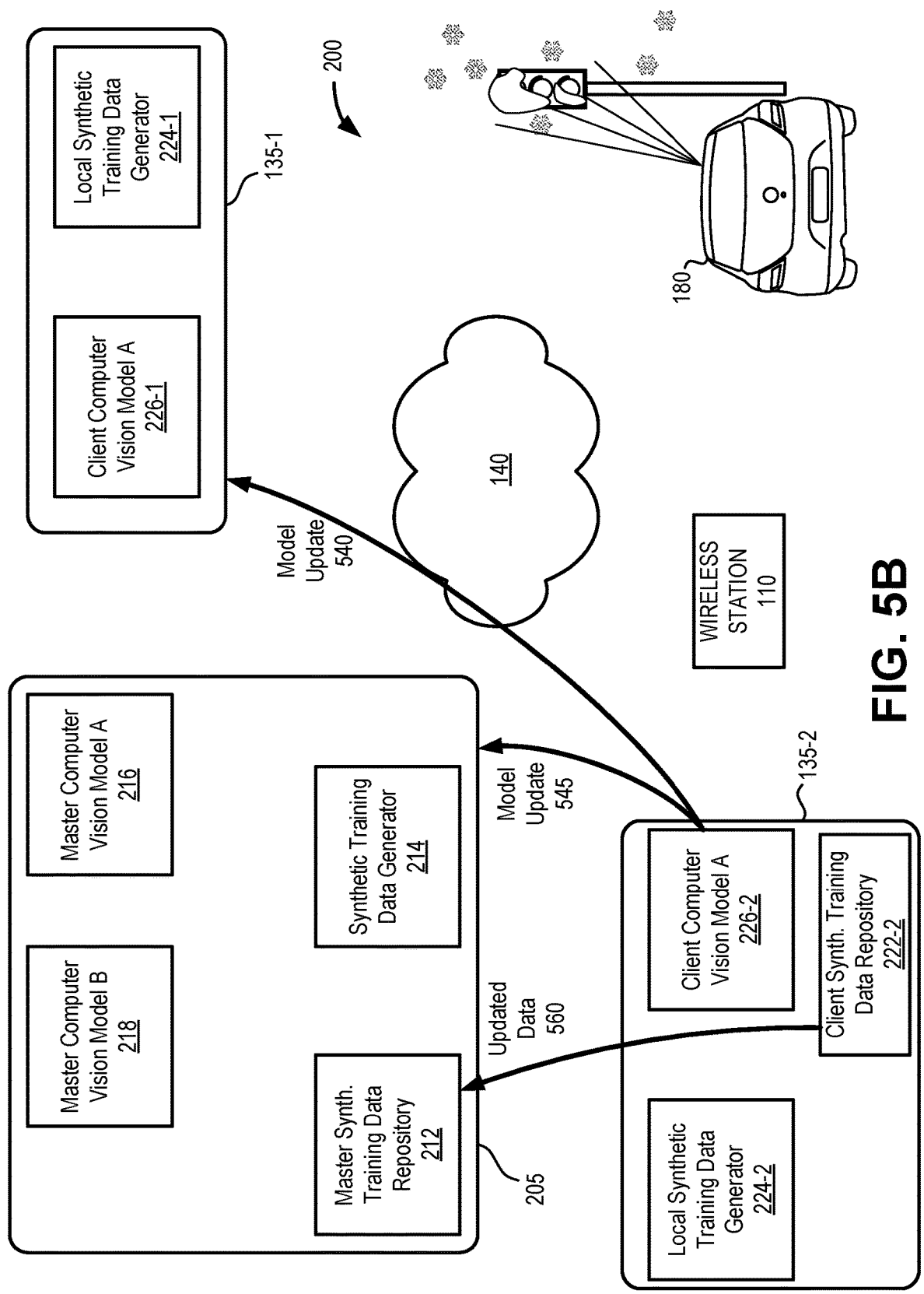

FIGS. 5A and 5B are diagrams illustrating exemplary communications in network portion 200 for performing distributed computer vision model training when MEC cluster 135 is unable to perform the local CV model retraining, according to another implementation. In the example of FIGS. 5A-5B, another MEC cluster 135 (e.g., MEC cluster 135-2) may perform computer vision model retraining if MEC cluster 135-1 lacks available computing resources.

As shown in FIG. 5A, assume that client device 180 provides an image and client CV Model A 226-1 detects an exception, as described above in connection with references 315 and 320 of FIG. 3B. Further assume MEC cluster 135-1 lacks available computing resources to perform local CV model retraining. In this case, as indicted at reference 525, client CV model A 226-1 may forward a flagged object to local synthetic training data generator 224-2 of MEC cluster 135-2. Local synthetic training data generator 224-2 may use the exception along with any annotated/exception data (e.g., an image of the exception) to then generate synthetic data based on the possible variants. Local synthetic training data generator 224-2 may provide a synthetic data update 530 to client CV model A 226-1. As indicated by reference 535, the new synthetic data may be temporarily stored in a client synthetic data repository 222-2 of MEC cluster 135-1.

Referring to FIG. 5B, according to an implementation, MEC cluster 135-2 may immediately provide an updated client CV model A 226-2 to MEC cluster 135-1, as indicated by reference 540. Thus, client CV model A 226-1 can be retrained/updated in real time at the most relevant geographic location. Additionally, or alternatively, MEC cluster 135-2 may provide updated client CV model A 226-2 to central cloud server 205, as indicated by reference 545. Similarly, master synthetic training data repository 212 is updated by client synthetic data repository 222-2 of MEC cluster 135-2, as indicated by reference 560. Similar to communications 355-370 described above, central cloud server 205 may proceed to incorporate updates from other MEC clusters 135, retrain all the master CV models that may be impacted, and push new updated models to each corresponding MEC cluster 135.

Figure 6:
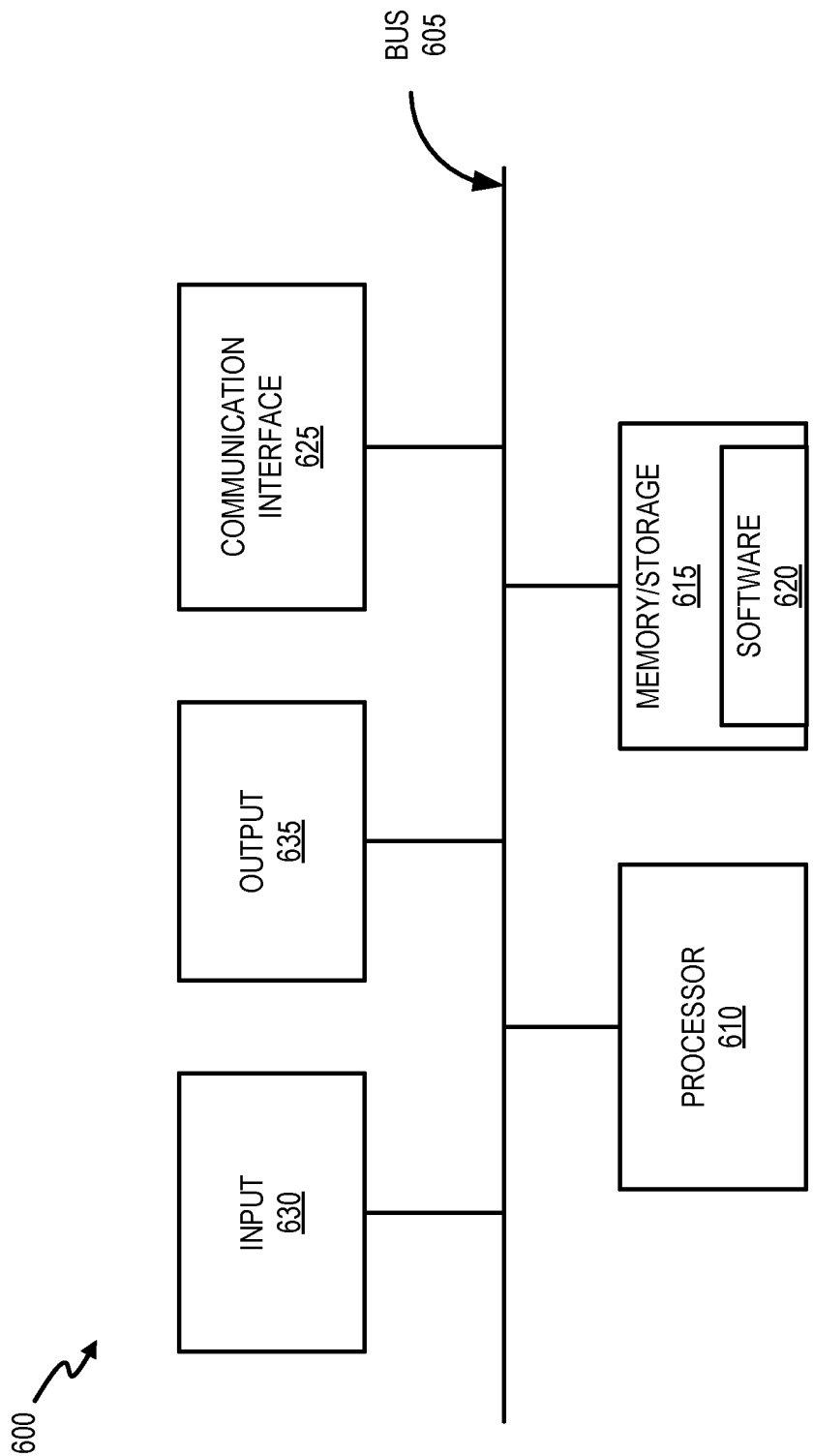
FIG. 6 is a block diagram illustrating exemplary components of a device that may correspond to one of the devices of FIGS. 1-5B.

FIG. 6 is a diagram illustrating exemplary components of a device 600 that may be included in one or more of the devices described herein. For example, device 600 may correspond to components included in wireless stations 110, MEC clusters 135, network devices 145, network devices 165, client device 180, and central cloud server 205. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium (e.g., a digital versatile disk (DVD), a Blu-Ray disk, etc.). Memory/storage 615 may store data, software, and/or instructions related to the operation of device 600.

Software 620 includes an application or a program that provides a function and/or a process. As an example, with respect to MEC cluster 135, software 620 may include an application that, when executed by processor 610, provides a function to generate synthetic data and train/retrain computer vision models, as described herein. Additionally, with reference to a network device of external network 160 (e.g., central cloud server 205), software 620 may include an application that, when executed by processor 610, provides a function to receive and integrate synthetic training data into multiple computer vision models, as described herein. Software 620 may also include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard. Communication interface 625 may include an antenna. Communication interface 625 may include various processing logic or circuitry (e.g., multiplexing/de-multiplexing, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 600 may be implemented in the same manner. For example, device 600 may be instantiated, spun up, spun down, or undergo a life-cycle, using well-known virtualization techniques in MEC network, a public/private cloud or other type of network.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process described herein. Alternatively, for example, according to other implementations, device 600 performs a process described herein based on the execution of hardware (processor 610, etc.).

Figure 7A:
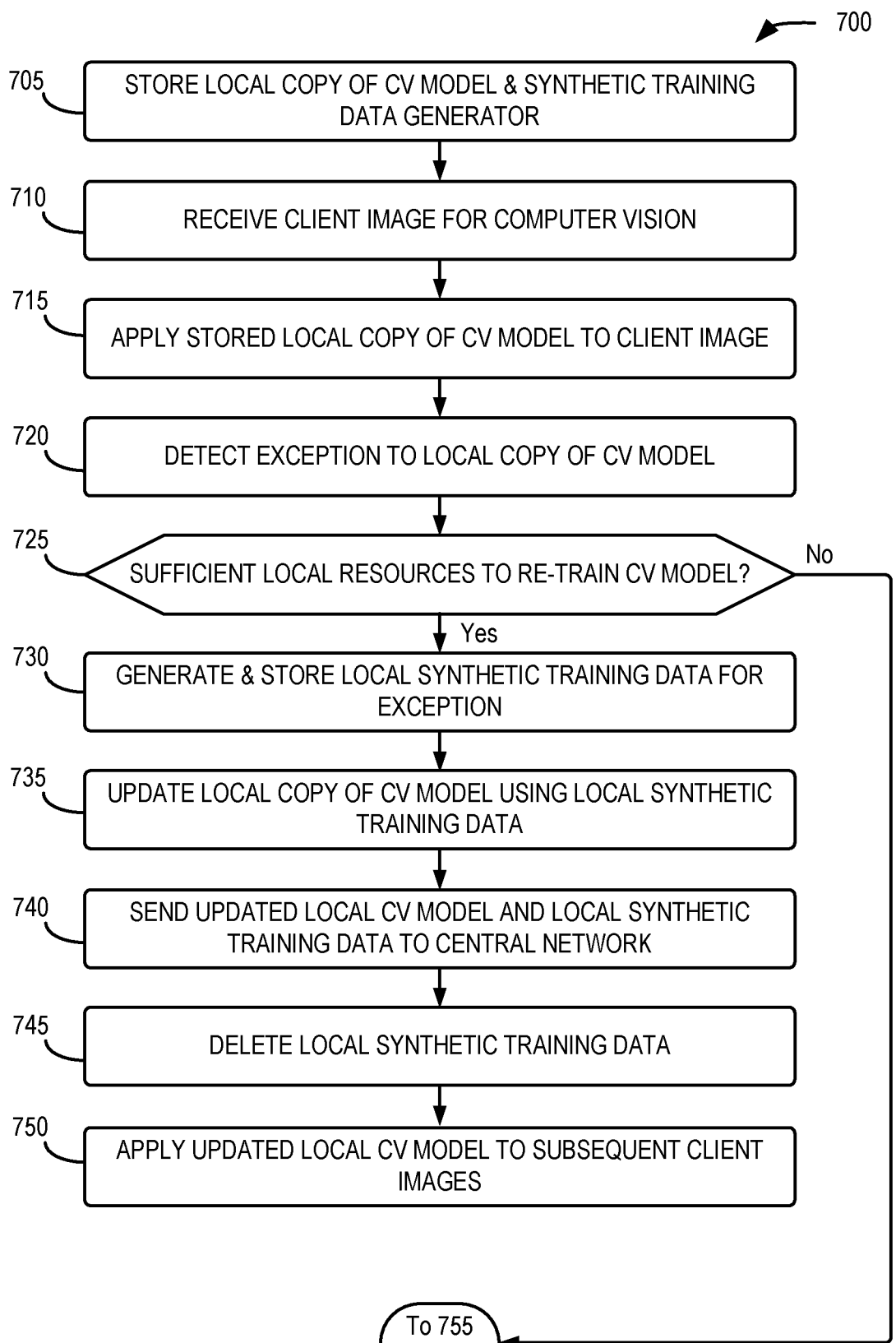
FIGS. 7A and 7B are flow diagrams illustrating an exemplary process for performing distributed computer vision model training, according to an implementation described herein.
Figure 7B:
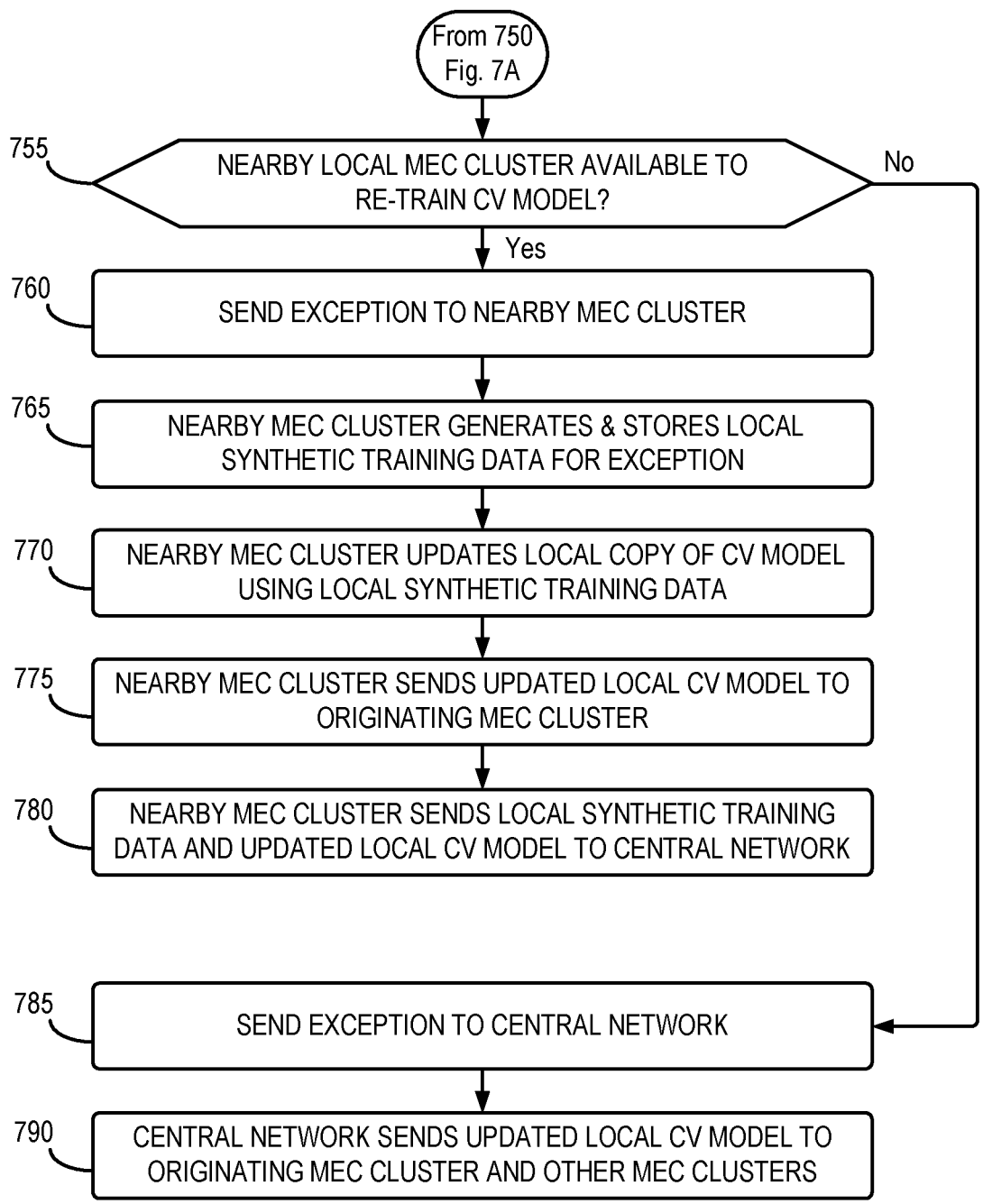

FIGS. 7A and 7B are flow diagrams of a process 700 for performing distributed computer vision model training. According to an exemplary embodiment, a network device of a MEC network performs steps of process 700. For example, the network device may be MEC cluster 135. According to another embodiment, multiple MEC clusters 135 and/or central network device 205 may perform steps of process 700. Additionally, for example, processor 610 may execute software 620 to perform a step illustrated in FIG. 7 and described herein. Additionally, or alternatively, a step illustrated in FIG. 7 may be performed by only hardware.

Process 700 may include storing a local copy of a CV model and a synthetic training data generator (block 705), and receiving a client image for a computer vision service (block 710). For example, MEC cluster 135 may be instantiated to provide a computer vision service for an application that uses computer vision models. MEC cluster 135 may receive, from central network device 205, a local copy of a computer vision model 226 and a local synthetic training data generator 224 to be stored at MEC cluster 135. In providing the computer vision service to a client device 180, MEC cluster 135 may receive an image or data set that requires a recognition task by the computer vision service.

Process 700 may also include applying the local copy of the CV model to the client image (block 715), detecting an exception to the local copy of the CV model (block 720), and determining if there are sufficient local resources to retrain the CV model (block 725). For example, MEC cluster 135 may apply the client image to client CV model 226 and, instead of a resulting in a successful recognition event, detects an exception to client CV model 226. The model exception may indicate a need for retraining of client CV model 226. MEC cluster 135 may determine whether sufficient computing resources are available to retrain client CV model 226. For example, MEC cluster 135 may evaluate current resource usage and/or projections to determine if MEC cluster 135 can retrain client CV model 226. Alternatively, an orchestrator function for MEC cluster 135 may manage resource allocation for multiple MEC clusters 135 and determine if sufficient resources are available.

If there are sufficient local resources to retrain the CV model (block 725—Yes), process 700 may include generating and storing local synthetic training data for the model exception (block 730), and updating the local copy of the CV model using the local synthetic training data (block 735). For example, local synthetic training data generator 224-1 may generate multiple types of artificial data that can be used to assist the retraining of client CV model A 226-1 in MEC cluster 135-1. Local synthetic training data generator 224-1 may provide a synthetic data update to client CV model A 226-1 and store the generated data in a local memory (e.g., client synthetic training data repository 222-1). Client CV model 226-1 may apply the new synthetic data to update itself (e.g., to be able to recognize the model exception).

Process 700 may further include sending the local synthetic training data to the central network device (block 740), deleting the local synthetic training data (block 745), and applying the updated local CV model to subsequent client images (block 750). For example, MEC cluster 135-1 may upload client synthetic training data repository 222-1 to central network device 205 (e.g., master synthetic training data repository 212). The updated/retrained client CV model A 226-1 may be immediately used by MEC cluster 135-1 to service new CV queries from client devices 180. In the meantime, central network device 205 may receive the local synthetic training data and other local synthetic training data from other MEC clusters 135 and retrain the master version of the computer vision model (e.g., master CV model A 216) to create a retrained computer vision model based on the compiled local synthetic training data. Central network device 205 may also transmit a copy of the retrained computer vision model to the different MEC clusters 135.

If there are not sufficient local resources to retrain the CV model (block 725—No), process 700 may include determining if a nearby MEC cluster is available to retrain the CV model (block 755), and if a nearby MEC cluster is available to retrain the CV model (block 755—Yes), sending the model exception to the nearby MEC cluster (block 760). For example, MEC 135-1 or an orchestrator function for MEC network 130 may determine if a geographically nearby MEC cluster (e.g., MEC cluster 135-2) has sufficient resources and can provide the required latency to generate local synthetic training data for retraining the client CV model. Assuming MEC cluster 135-1 identifies that MEC cluster 135-2 can support the model retraining process, MEC cluster 135-1 may forward data for the model exception (e.g., the image, location, data points, etc.) to MEC cluster 135-2.

The nearby MEC cluster may generate and store local synthetic training data for exception (block 765), update a local copy of the CV model using the local synthetic training data (block 770), and send the updated copy of the CV model to the originating MEC cluster (block 775), and send the local synthetic training data and the updated copy of the CV model to the central network (block 780). For example, local synthetic training data generator 224-2 may generate multiple types of artificial data that can be used to assist the retraining of client CV model A 226-2 in MEC cluster 135-2. Local synthetic training data generator 224-2 may provide a synthetic data update to client CV model A 226-2 and store the generated data in a local memory (e.g., client synthetic training data repository 222-2). Client CV model 226-2 may apply the new synthetic data to update itself and then MEC cluster 135-2 may send the updated client CV model 226-2 to MEC cluster 135-1. MEC cluster 135-2 may also send the updated client CV model 226-2 and the client synthetic training data repository 222-2 to central cloud server 205.

If a nearby MEC cluster is not available to retrain the CV model (block 755—No), process 700 may include sending the model exception to the central network (block 785). The central cloud server may retrain the CV model and send updated local CV models to the originating MEC cluster and other MEC clusters (block 790). For example, MEC cluster 135-1 may determine that no other MEC cluster 135 can perform client CV model retraining more efficiently than central cloud server 205. MEC cluster 135-1 may forward data for the model exception to central cloud server 205. Central cloud server 205 (e.g., synthetic training data generator 214) may generate multiple types of artificial data that can be used to assist the retraining of master CV model A 216. Synthetic training data generator 214 may provide a synthetic data update to master CV model A 216 and store the generated data in master synthetic training data repository 212. Master CV model 226-2 may apply the new synthetic training data to retrain itself, and then central cloud server 205 may push the updated client CV model A 216 to the applicable MEC clusters 135 (e.g., including MEC cluster 135-1).

Systems and methods described herein perform computer vision model training in a distributed edge network. Regional MEC clusters may be provided with a local copy of a CV model. Regional MEC clusters may be provided with a local synthetic training data generator. A MEC cluster receives data from a client device requiring a computer vision service and applies the local copy of the CV model to the client data. The MEC cluster detects an exception to the local copy of the CV model and generates local synthetic training data for the exception. The MEC cluster updates, based on the local synthetic training data, the local copy of the CV model to form an updated local CV model. The MEC cluster may use the updated local CV model to perform further computer vision services. The MEC cluster sends the local synthetic training data and the updated local CV model to the central network device. The central network device uses the local synthetic training data to update a master CV model and any other interconnected CV models.

While the system and methods have been illustrated primarily in the context of computer vision for vehicle systems, the distributed computer vision model training may also be used for other applications where model training/retraining and timing constraints are involved, such as computer vision for other environments. For example, the system and methods described herein may also be applied in automated factory systems, warehousing/inventory management systems, augmented reality systems, and/or virtual reality systems that use MEC networks.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. Various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signals and blocks have been described with regard to the processes illustrated in FIGS. 3A-5B, 7A, and 7B, the order of the signals and blocks may be modified according to other embodiments. Further, non-dependent signals or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory 615.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   receiving, by an edge device in a distributed edge network and from a central network device, a copy of a computer vision model and a synthetic training data generator;
   receiving, by the edge device and from a client device, first client data requiring computer vision;
   applying, by the edge device, the copy of the computer vision model to the first client data;
   detecting, by the edge device and based on the applying, an exception to the copy of the computer vision model;
   generating, by the edge device, synthetic training data for the exception;
   updating, by the edge device and based on the synthetic training data, the copy of the computer vision model to form an updated computer vision model; and
   sending, by the edge device, the synthetic training data to the central network device.

2. The method of claim 1, further comprising:
   storing, by the edge device, the synthetic training data; and
   sending, by the edge device, the updated computer vision model to the central network device.

3. The method of claim 2, further comprising:
   deleting, by the edge device, the synthetic training data after sending the synthetic training data to the central network device.

4. The method of claim 1, further comprising:
   receiving, by the central network device, the synthetic training data and other synthetic training data from other edge devices;
   retraining, by the central network device, a master version of the computer vision model to create a retrained computer vision model, wherein the retraining is based on the synthetic training data and the other synthetic training data; and
   sending, by the central network device, a copy of the retrained computer vision model to the edge device and the other edge devices.

5. The method of claim 4, further comprising:
   retraining, by the central network device, master versions of different computer vision models that rely on the same synthetic training data.

6. The method of claim 1, further comprising:
   receiving, by the edge device, a copy of a retrained master computer vision model from the central network device, wherein the retrained master computer vision model is based on the synthetic training data and other synthetic training data from other edge devices; and
   storing, by the edge device, the copy of the retrained master computer vision model.

7. The method of claim 6, wherein storing the copy of the retrained master computer vison model includes replacing the updated computer vision model with the copy of the retrained master computer vision model.

8. The method of claim 1, wherein the edge device includes an application function in a Multi-access Edge Compute (MEC) cluster.

9. The method of claim 1, further comprising:
   applying, by the edge device, the updated computer vision model to second client data requiring computer vision, wherein the second client data is received after the updating.

10. A system comprising:
    a first edge device in a Multi-access Edge Compute (MEC) network, the first edge device configured to:
       receive from a central network device, a copy of a computer vision model and a synthetic training data generator;
       receive, from a client device, first client data requiring computer vision;
       apply the copy of the computer vision model to the first client data;
       detect, based on the applying, an exception to the copy of the computer vision model;
       generate synthetic training data for the exception;
       update, based on the synthetic training data, the copy, of the computer vision model to form an updated computer vision model; and
       send the Synthetic training data to the central network device.

11. The system of claim 10, wherein the first edge device is further configured to:
    send the updated computer vision model to the central network device.

12. The system of claim 10, wherein the first edge device is further configured to:
    store the synthetic training data; and
    delete the synthetic training data after sending the synthetic training data to the central network device.

13. The system of claim 10, further comprising:
    the central network device in a cloud network, the central network device configured to:
        receive the synthetic training data and other synthetic training data from other edge devices;
        retrain a master version of the computer vision model to create a retrained computer vision model, wherein the retraining is based on the synthetic training data and the other synthetic training data; and
        send a copy of the retrained computer vision model to the edge device and the other edge devices.

14. The system of claim 13, wherein the central network device is further configured to:
    retrain master versions of different computer vision models that rely on the same synthetic training data.

15. The system of claim 10, wherein the first edge device is further configured to:
    receive a copy of a retrained master computer vision model from the central network device, wherein the retrained master computer vision model is based on the synthetic training data and other synthetic training data from other edge devices; and
    store the copy of the retrained master computer vision model.

16. The system of claim 15, wherein the first edge device is further configured to:
    replace the updated computer vision model with the copy of the retrained master computer vision model.

17. The system of claim 10, wherein the first edge device is further configured to:
    apply the updated computer vision model to second client data requiring computer vision, wherein the second client data is received after the updating.

18. A non-transitory computer-readable storage medium storing instructions executable by a processor of a device in a network, which when executed cause the device to:
    receive, from a central network device, a copy of a computer vision model and a synthetic training data generator;
    receive, from a client device, first client data requiring computer vision;
    apply the copy of a computer vision model to the first client data;
    detect, based on the applying, an exception to the copy of the computer vision model;
    generate synthetic training data for the exception;
    update, based on the synthetic training data, the copy of the computer vision model to form an updated computer vision model; and
    send the synthetic training data to the central network device.

19. The non-transitory computer-readable storage medium of claim 18, further comprising instructions which when executed cause the device to:
    store the synthetic training data; and
    delete the synthetic training data after sending the synthetic training data to the central network device.

20. The non-transitory computer-readable storage medium of claim 18, further comprising instructions which when executed cause the device to:
    apply the updated computer vision model to second client data requiring computer vision, wherein the second client data is received after the updating.

* * * * *